(12) United States Patent
Fukui et al.

(10) Patent No.: US 7,885,496 B2
(45) Date of Patent: Feb. 8, 2011

(54) LIGHT RECEIVING APPARATUS, ELECTRONIC APPARATUS AND IMAGE DISPLAY APPARATUS

(75) Inventors: Nobuyuki Fukui, Nagano (JP); Yutaka Ogasawara, Saitama (JP); Hideaki Kurachi, Kanagawa (JP); Yoshiyuki Nida, Saitama (JP)

(73) Assignee: Sony Corporation, Tokyo (JP)

( * ) Notice: Subject to any disclaimer, the term of this patent is extended or adjusted under 35 U.S.C. 154(b) by 222 days.

(21) Appl. No.: 12/343,855

(22) Filed: Dec. 24, 2008

(65) Prior Publication Data

US 2009/0166537 A1    Jul. 2, 2009

(30) Foreign Application Priority Data

Dec. 28, 2007    (JP) .............................. 2007-341026

(51) Int. Cl.
*G02B 6/42* (2006.01)
*H04B 10/06* (2006.01)

(52) U.S. Cl. ........................... 385/38; 385/88; 398/212; 398/214

(58) Field of Classification Search .................... 385/38; 398/212–214
See application file for complete search history.

(56) References Cited

U.S. PATENT DOCUMENTS 7,421,160 B1 *    9/2008    Budd et al. .................... 385/33

* cited by examiner

*Primary Examiner*—Jerry T Rahll
(74) *Attorney, Agent, or Firm*—Oblon, Spivak, McClelland, Maier & Neustadt, L.L.P.

(57) ABSTRACT

Disclosed herein is a light receiving apparatus, including: a light receiving section including a light receiving element; a transparent part; and a light guiding part inserted in the groove; the groove having, on the front face side, a side face formed as an arcuately curved face convex toward the front face side and having the same shape in any cross section perpendicular to the front face and also to the depthwise direction of the groove; the light guiding part having a side face opposing to the side face of the groove on the front face side and formed as an arcuately curved face which is convex toward the front face side in a state wherein the light guiding part is inserted in the groove and which has the same shape in any cross section perpendicular to the front face and also to the depthwise direction of the groove.

5 Claims, 16 Drawing Sheets

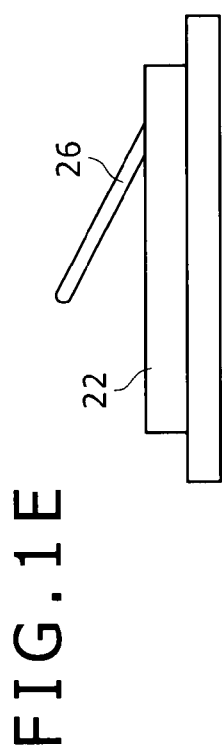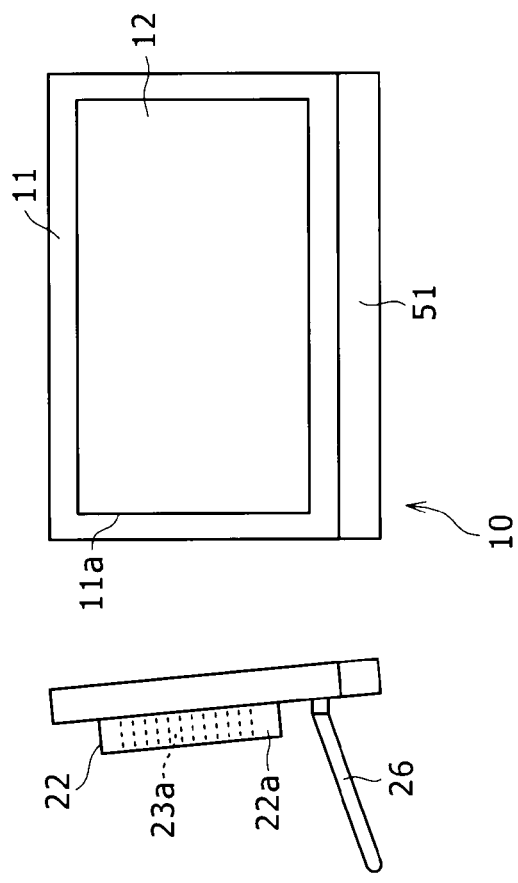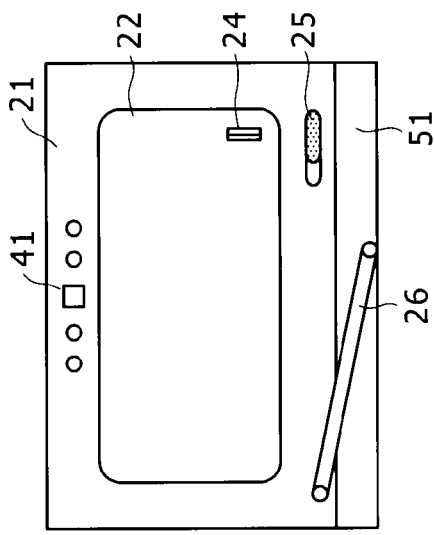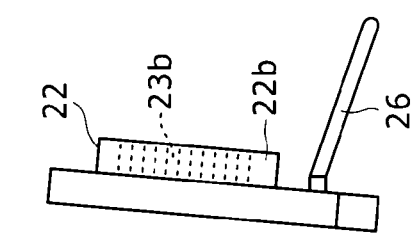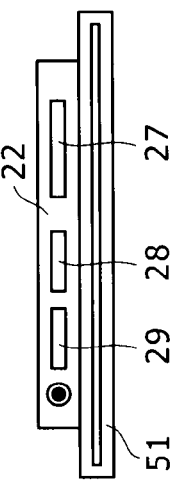

FIG. 8
FOLDER NAME : 2007Xmas
IMG_0150.jpg
2007/12/24 15:59:07
IMG_0151.jpg
2007/12/24 16:18:44
IMG_0151.jpg
2007/12/24 16:57:04
IMG_0151.jpg
2007/12/24 17:43:16
(BACK) RETURN

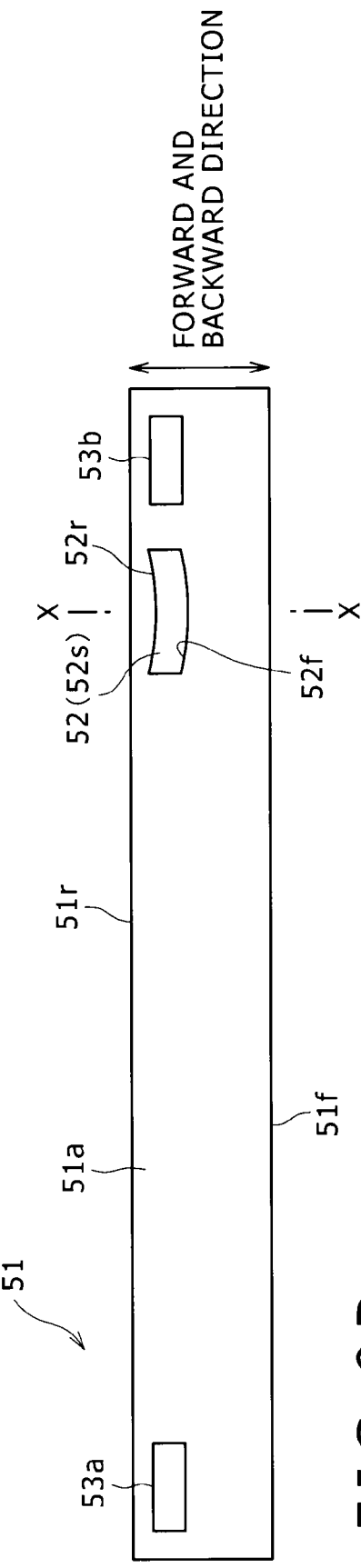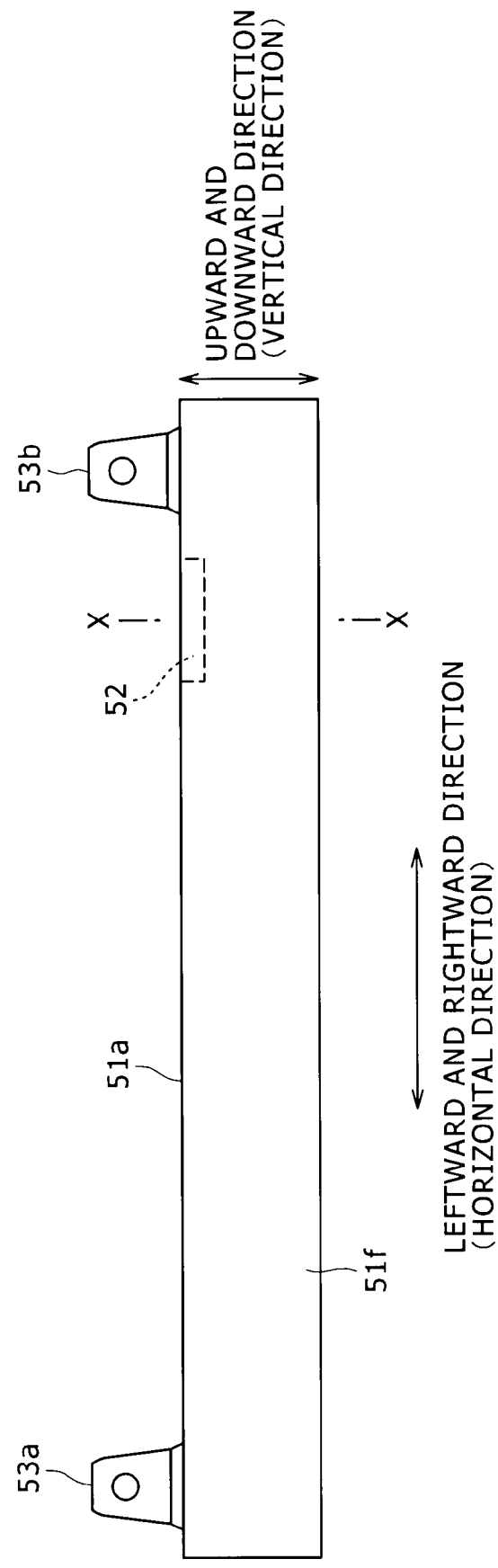

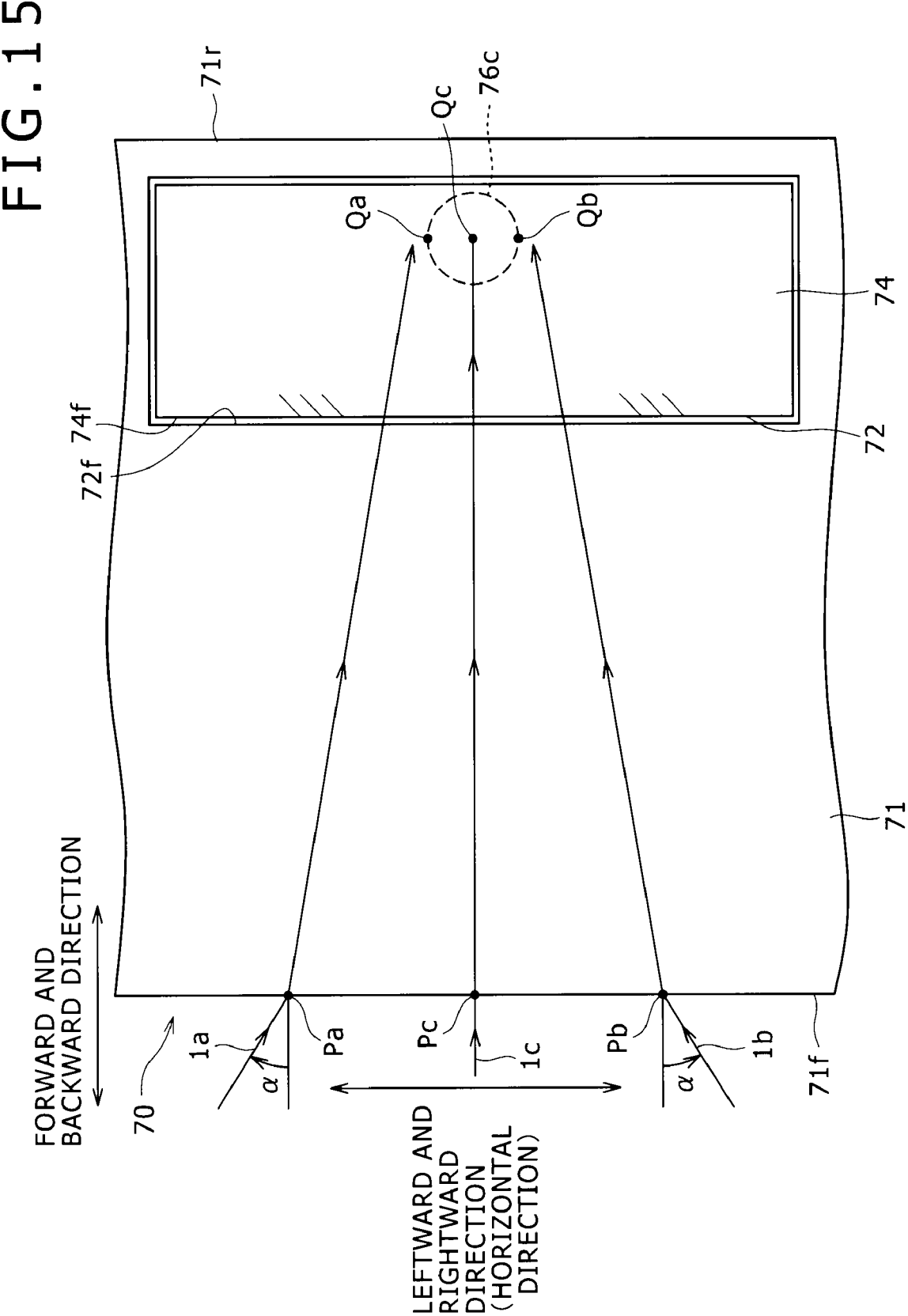

LIGHT RECEIVING APPARATUS, ELECTRONIC APPARATUS AND IMAGE DISPLAY APPARATUS

CROSS REFERENCES TO RELATED APPLICATIONS

The present invention contains subject matter related to Japanese Patent Application JP 2007-341026 filed in the Japan Patent Office on Dec. 28, 2007, the entire contents of which being incorporated herein by reference.

BACKGROUND OF THE INVENTION

1. Field of the Invention

This invention relates to an apparatus for receiving signal light from a remote controller or a like apparatus, and an electronic apparatus and an image display apparatus which include a light receiving apparatus.

2. Description of the Related Art

Apparatus for receiving signal light from an infrared remote controller for an electronic apparatus which includes a display panel such as an LCD (Liquid Crystal Display) panel like a television receiver in most cases reflect signal light incident thereto so as to be introduced to a light receiving section.

Japanese Patent Laid-Open No. 2007-184773 (hereinafter referred to as Patent Document 1) discloses, as such a light receiving apparatus as described above, such an apparatus as shown in FIGS. 16A and 16B.

FIG. 16A is shown as FIG. 5 in Patent Document 1, and FIG. 16B is a side elevational view showing a light guiding part and a light receiving section shown in FIG. 16A. It is to be noted that reference characters used in FIGS. 16A and 16B are different from those used in Patent Document 1.

Referring to FIGS. 16A and 16B, a light guiding part 94 is formed integrally on a transparent panel 91 in the form of a flat plate such that it partly projects from a front face 91*f*, an upper face 91*a* and a back face 91*r* of the panel 91. A front face 94*f* and a back face 94*s* at a lower portion of the light guiding part 94 are formed as inclined faces.

If signal light 9 comes to the front face 94*f* of the light guiding part 94 from the front face side of the panel 91, then it is refracted by the front face 94*f* and enters the light guiding part 94, whereafter it is reflected by the back face 94*s* and a different face of the light guiding part 94 and goes out upwardly from the light guiding part 94 so that it is received by a light receiving section or light receiving element 96.

SUMMARY OF THE INVENTION

However, the light receiving apparatus disclosed in Patent Document 1 and described above with reference to FIGS. 16A and 16B is not preferable in terms of the design because the light guiding part 94 is exposed to the front face side of the panel 91 which is a sheathing of the apparatus.

Therefore, the inventor of the invention of the present application devised such an apparatus as shown in FIGS. 14 and 15. FIG. 14 shows a cross section of the apparatus taken along a perpendicular plane to the leftward and rightward direction, which is a transverse direction of the screen of an LCD panel not shown, and FIG. 15 shows a cross section taken along line Z-Z of FIG. 14.

Referring to FIGS. 14 and 15, the light receiving apparatus 70 shown includes a transparent part 71 which is formed in a prism shape elongated in the leftward and rightward direction such that signal light is incident to a front face 71*f* of the transparent part 71. A groove 72 is formed on an upper face 71*a* of the transparent part 71.

The groove 72 has, in the forward and backward direction, a triangular shape such that the depth thereof increases in the forward direction such that a bottom face 72*s* is formed as an inclined face. Meanwhile, in the leftward and rightward direction, a side face 72*f* of the groove 72 on the front side is formed as a flat face parallel to the front face 71*f* of the transparent part 71.

A light guiding part 74 is formed such that a lower portion thereof extends along the groove 72. In particular, the lower portion of the light guiding part 74 has, in the forward and backward direction, a triangular shape such that it projects to the lower side in the forward direction so as to form a lower face 74*s* as an inclined face. Meanwhile, in the leftward and rightward direction, a side face 74*f* of the light guiding part 74 on the front side is formed as a flat face extending in parallel to the front face 71*f* of the transparent part 71.

A light receiving section 76 including a light receiving element 77 is attached to the back of a light receiving section mounting board 19 such that a projection 76*a* for condensing incident light is directed downwardly.

Then, in a state wherein the light receiving section 76 is mounted on the back of the light receiving section mounting board 19 and the light guiding part 74 is mounted on the lower side of the light receiving section mounting board 19 in this manner, the transparent part 71 is mounted on the lower side of the apparatus such that the lower portion of the light guiding part 74 is inserted into the groove 72 of the transparent part 71 such that the lower face 74*s* of the light guiding part 74 is positioned in the proximity of the bottom face 72*s* of the groove 72 and the side face 74*f* of the light guiding part 74 is positioned in the proximity of the side face 72*f* of the groove 72.

In the light receiving apparatus 70 having the configuration described above, if signal light from an infrared remote controller is incident to a point Pc on the front face 71*f* of the transparent part 71 perpendicularly to the front face 71*f*, that is, at an incident angle of 0 degree not only in the leftward and rightward direction but also in the upward and downward direction as indicated as incident light 1*c* in FIG. 14 or 15, then the incident light 1*c* advances straightforwardly to a point Qc on the lower face 74*s* of the light guiding part 74 through the transparent part 71 and the light guiding part 74. Then, the signal light is reflected upwardly at the point Qc, and the light receiving section 76 receives the signal light as light incident to the center of an effective receiving area 76*c*.

Though not shown in FIG. 14, also signal light incident at an incident angle of 0 degree in the leftward and rightward direction, that is, in a direction perpendicular to the plane of FIG. 14, and at an incident angle within a fixed range in the upward and downward direction, for example, to the point Pc, is received by the light receiving section 76 similarly.

However, in the light receiving apparatus 70, since the light guiding part 74 is not exposed to the front face side of the transparent part 71, also the light receiving section 76 can be disposed on the inner side of the apparatus sheathing, and therefore, the light receiving apparatus 70 is preferable in terms of the design. However, the range within which light can be received by the light receiving section 76 with regard to the incident position and the incident angle to the transparent part 71 in the leftward and rightward direction cannot be made very great.

In particular, as indicated as incident light 1*a* in FIG. 15, signal light incident at a certain incident angle α in the leftward direction to a point Pa on the front face 71*f* of the transparent part 71 spaced by a certain distance in the leftward direction from the point Pc is refracted by the front face 71f and enters the transparent part 71. Thereafter, the signal light enters the side face 72f of the groove 72 and the side face 74f of the light guiding part 74 at comparatively large incident angles. Consequently, the signal light is reflected upwardly at a point on the lower face 74s of the light guiding part 74 spaced in the leftward direction from a point Qa corresponding to the left end of the effective receiving area 76c, but is not received by the light receiving section 76.

Similarly, as indicated as an incident light 1b in FIG. 5, signal light incident to a point Pb on the front face 71f of the transparent part 71 spaced by a certain distance in the rightward direction from the point Pc at a certain incident angle α in the rightward direction is refracted by the front face 71f and enters the transparent part 71, whereafter it enters the side face 72f of the groove 72 and the side face 74f of the light guiding part 74 at a comparatively large incident angle. Therefore, the signal light is reflected upwardly at a point on the lower face 74s of the light guiding part 74 spaced in the rightward direction from the point Pb corresponding to the right end of the effective receiving area 76c, but is not received by the light receiving section 76.

Therefore, it is desirable to provide a light receiving apparatus, an electronic apparatus and an image display apparatus which are preferable in terms of the design and can receive light over an increased range.

According to an embodiment of the present invention, there is provided a light receiving apparatus including a light receiving section including a light receiving element, a transparent part having a front face which is a first face to which signal light is incident and a second face extending perpendicularly to the first face and having a groove formed thereon, and a light guiding part inserted in the groove, the groove having a bottom face formed as an inclined face having a depth which increases toward the front face side, the groove further having, on the front face side, a side face formed as an arcuately curved face convex toward the front face side and having the same shape in any cross section perpendicular to the front face and also to the depthwise direction of the groove, the light guiding part having a face opposing to the bottom face of the groove, formed as an inclined face having a depth which increases toward the front side face in as state in which the light guiding part is inserted in the groove, the light guiding part further having a side face opposing to the side face of the groove on the front face side and formed as an arcuately curved face which is convex toward the front face side in a state wherein the light guiding part is inserted in the groove and which has the same shape in any cross section perpendicular to the front face and also to the depthwise direction of the groove.

In the light receiving apparatus of the configuration described, the light guiding part is not exposed to the outer side of the apparatus sheathing, and also the light receiving section can be disposed on the inner side of the apparatus sheathing. Therefore, the light receiving apparatus is preferable in terms of the design.

Besides, the bottom face of the groove of the transparent part and the face of the light guiding part which opposes to the bottom face of the groove of the transparent part are inclined faces which have a depth which increases toward the front face side of the transparent part, and the side face of the groove of the transparent part on the front face side and the side face of the light guiding part which opposes to the side face of the groove of the transparent part on the front face side are arcuately curved faces which are convex toward the front face side. Therefore, the range within which the light receiving section can receive light is increased.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 1A, 1B, 1C, 1D, 1E and 1F are a front elevational view, a left side elevational view, a right side elevational view, a rear elevational view, a top plan view and a bottom plan view, respectively, showing a configuration of an appearance of an image display apparatus as an example of an electronic apparatus to which an embodiment of the present invention is applied;

FIGS. 7 and 8 are schematic views showing display images of the image display apparatus of FIGS. 1A to 1F;

FIGS. 9A and 9B are a schematic top plan view and a front elevational view, respectively, showing an example of a transparent part of a light receiving apparatus to which an embodiment of the present invention is applied;

FIG. 15 is a sectional view taken along line Z-Z of FIG. 14; and

DETAILED DESCRIPTION OF THE PREFERRED EMBODIMENT

Figure 2:
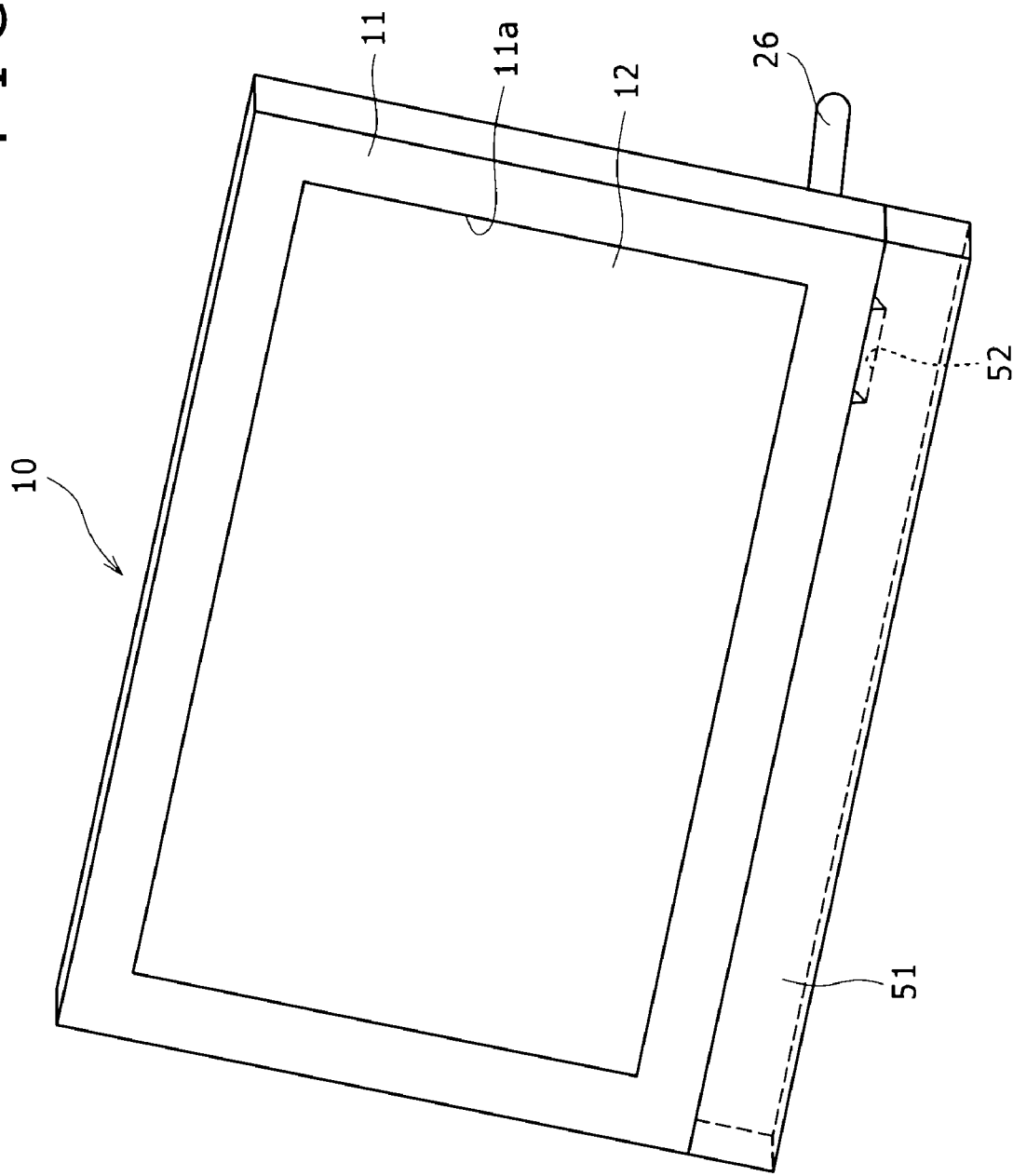
FIG. 2 is a schematic view showing the image display apparatus of FIGS. 1A to 1F as viewed in an oblique direction from the front side.

1. Image Display Apparatus as an Example of an Electronic Apparatus Including a Light Receiving Apparatus FIGS. 1A to 8

First, an image display apparatus as an example of an electronic apparatus which uses a light receiving apparatus according to an embodiment of the present invention is described.

1-1. Appearance Configuration of the Image Display Apparatus (FIGS. 1A to 5)

FIGS. 1A to 5 show a configuration of an appearance of an example of an image display apparatus.

Referring to FIGS. 1A to 5, the image display apparatus 10 shown can reproduce and display an image such as a still image and reproduce and output sound such as music.

In particular, where the image display apparatus 10 is viewed from the front face side, a front panel 12 formed from a light-transmitting material such as PMMA (polymethyl methacrylate) is attached to the back of a bezel 11, which covers the front face of a display apparatus housing, in such a manner as to cover over a window 11a of the bezel 11. An LCD panel 13 including an LCD unit and a backlight is attached to the back of the front panel 12. A light receiving section mounting board 19 is attached to the back of the LCD panel 13 in such a manner that it is not exposed from the display apparatus housing as viewed from the front side. Furthermore, a stand 51 formed from a light-transmitting material such as PMMA is attached to a lower portion of a side edge of the display apparatus housing.

Though not shown in FIGS. 1A to 5, a light receiving section including a light receiving element is attached to the light receiving section mounting board 19 as hereinafter described.

In the display apparatus housing, a plurality of boards are attached in addition to the light receiving section mounting board 19. However, they are omitted in FIGS. 3 and 4.

The stand 51 is a transparent part which forms part of the light receiving apparatus. Such a groove 52 as hereinafter described is formed on an upper face of the stand 51 or transparent part, and such a light guiding part as hereinafter described is inserted in the groove 52 though not shown in FIGS. 2 to 5.

As seen from FIGS. 1B to 1F and 5, a rear cover 22 is attached to the back face 21 of the display apparatus housing of the image display apparatus 10.

A large number of fine holes 23a and 23b for sound emission are formed in a side face 22a on the left side and another side face 22b on the right side of the rear cover 22 as viewed from the front of the apparatus, respectively. A pair of left and right speakers are attached to upper portions on the inner side of the side faces 22a and 22b, respectively.

A USB (Universal Serial Bus) terminal 24 is provided at a position near to one of corners of the rear cover 22, and a radio LAN (Local Area Network) switch 25 of the slide type is provided at a lower position of the rear cover 22 on the right side as viewed from the back side of the apparatus. Further, a support leg 26 is attached to a lower position of the rear cover 22 on the left side as viewed from the rear face side of the apparatus.

The support leg 26 can be pivoted around one end thereof attached to the back face 21, and the image display apparatus 10 can be placed and erected uprightly on a desk or the like.

Figure 5:
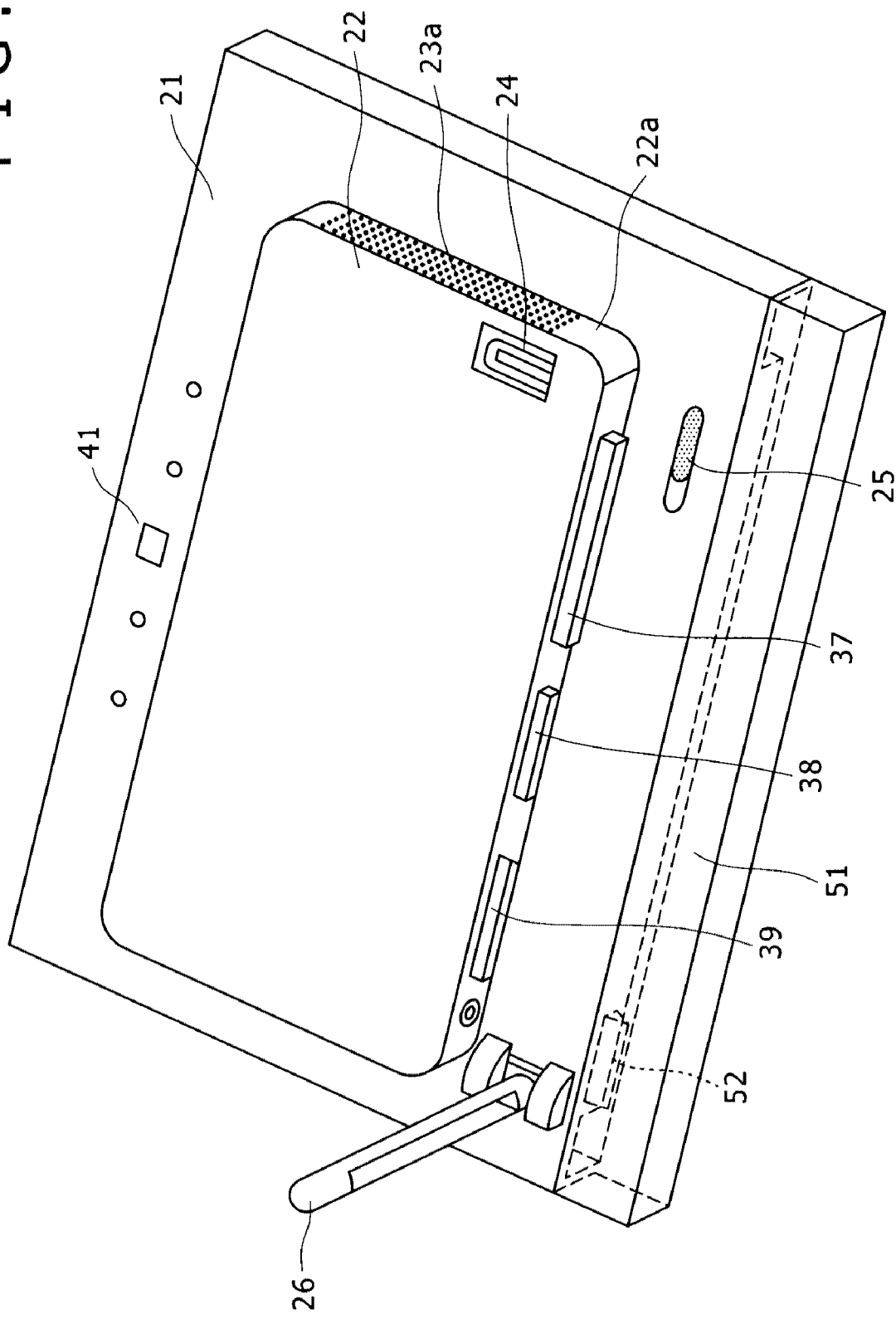
FIG. 5 is a perspective view showing the image display apparatus of FIGS. 1A to 1F as viewed in an oblique direction from the back side.

Further, as shown in FIG. 1F, slots 27, 28 and 29 are formed on a lower side face of the rear cover 22, and three different memories 37, 38 and 39 in the form of a card or a stick such as a memory stick (registered trademark) are inserted into the slots 27, 28 and 29 as seen in FIG. 5, respectively.

As seen in FIGS. 1D and 5, a panel operation section 41 including operation buttons such as a power supply button is provided at an upper portion of the back face 21.

1-2. Connection Scheme and Function of the Image Display Apparatus (FIGS. 6 to 8)

<Connection Scheme>

Figure 6:
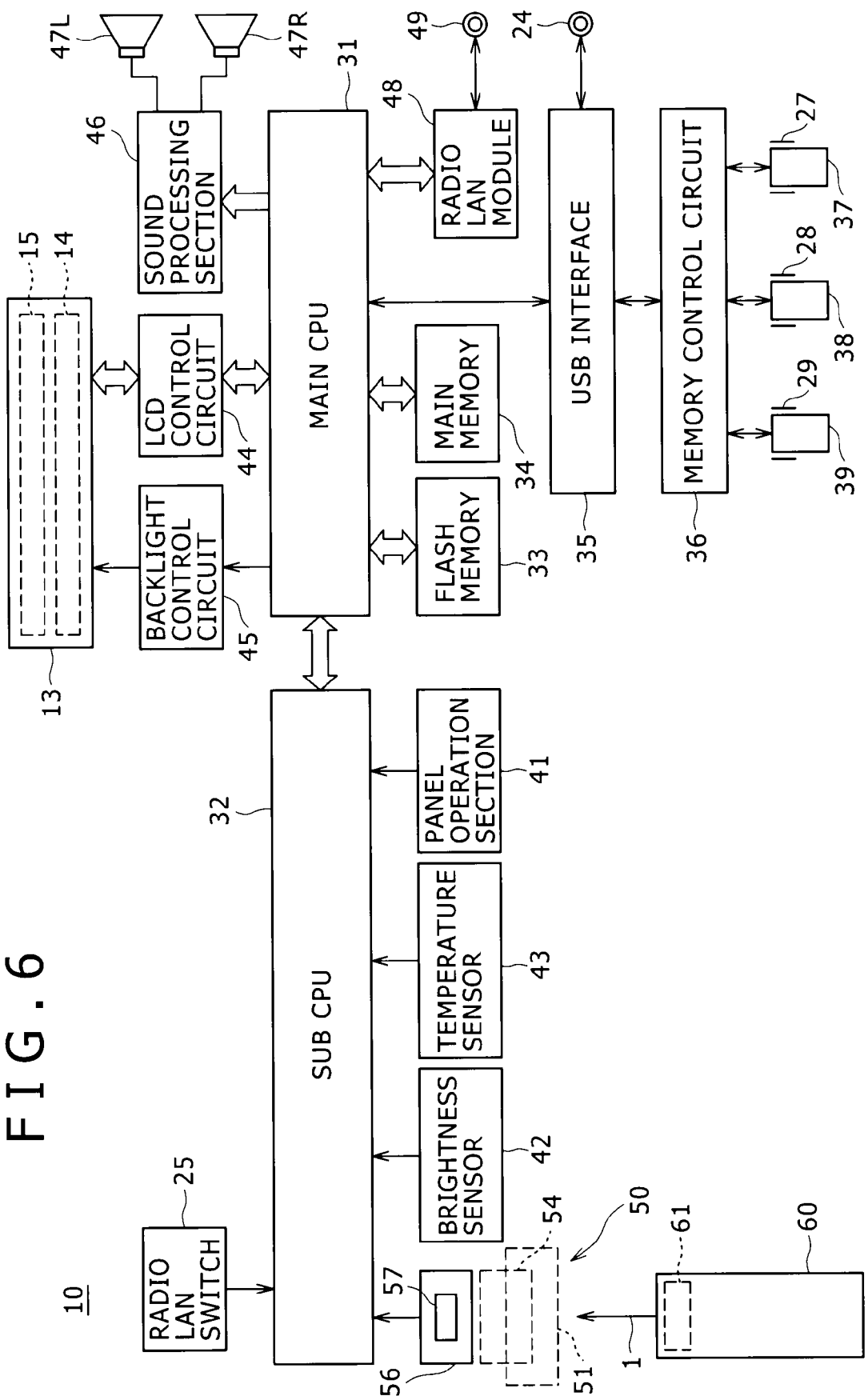
FIG. 6 is a block diagram showing a connection scheme of the image display apparatus of FIGS. 1A to 1F.
Figure 7:
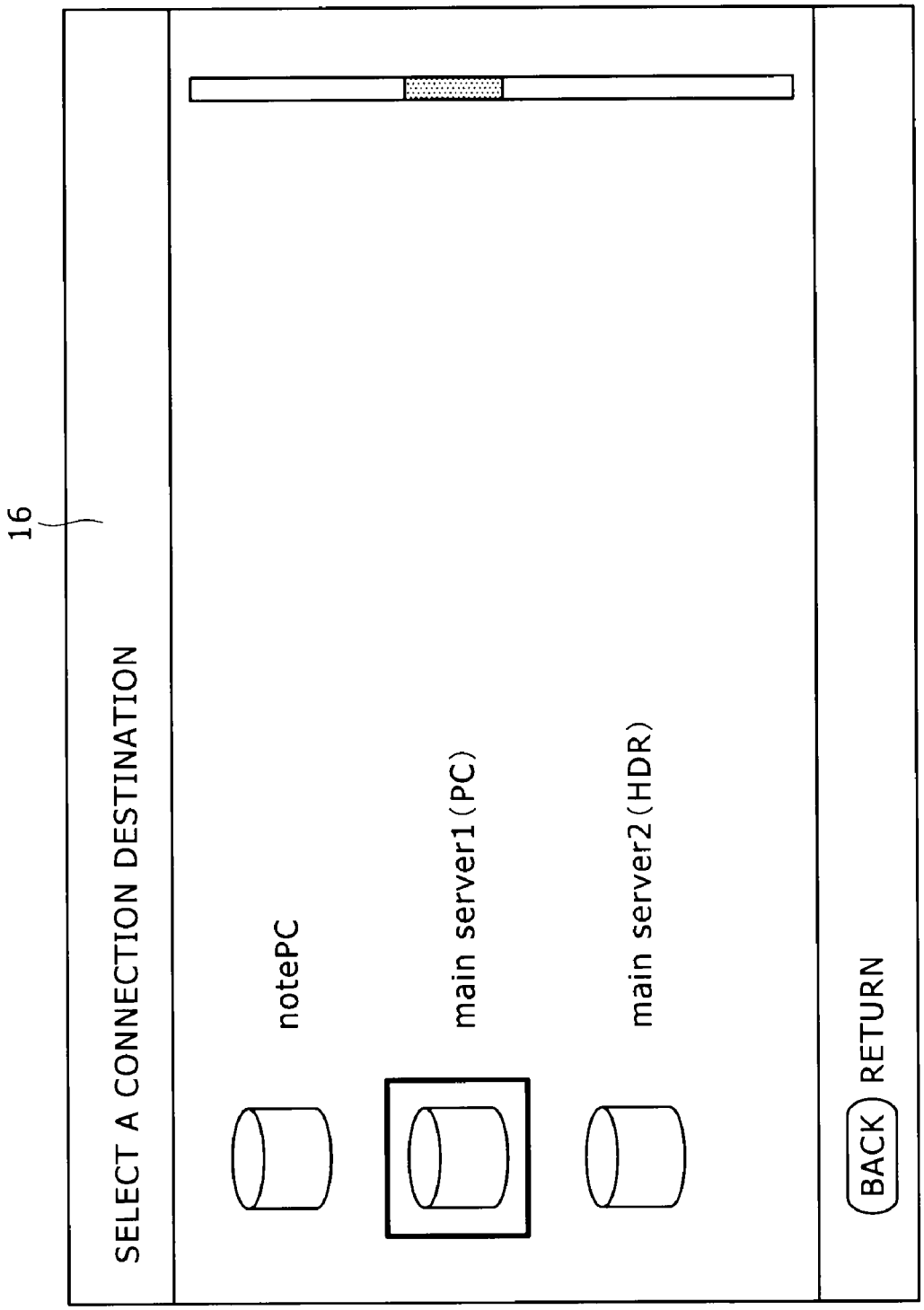

FIG. 6 shows an example of a connection scheme of the image display apparatus 10.

Referring to FIG. 6, the LCD panel 13 includes an LCD unit 14 and a backlight 15, and the image display apparatus 10 includes a main CPU (central processing unit) 31 and a sub CPU 32.

A light emitting section 56, a brightness sensor 42, a temperature sensor 43, and the panel operation section 41 and radio LAN switch 25 described hereinabove are connected to the sub CPU 32.

The light emitting section 56, a light guiding part 54 hereinafter described and the transparent part or stand 51 form the light receiving section 50. Signal light 1 emitted from an infrared light emitting section 61 of a remote controller 60 enters the light emitting section 56 through the transparent part 51 and the light guiding part 54 and is detected by a light receiving element 57 in the light emitting section 56.

Though not shown in FIGS. 1A to 5, the brightness sensor 42 controls the brightness of the LCD unit 14 in response to the brightness around the image display apparatus 10 detected by the brightness sensor 42. In particular, when the surroundings are bright, also the brightness of the LCD unit 14 is set to a high level, but when the surroundings are dark, also the brightness of the LCD unit 14 is set to a low level.

Though not shown in FIGS. 1A to 5, the temperature sensor 43 displays the temperature, that is, the air temperature, in the surroundings of the image display apparatus 10 detected by the temperature sensor 43 on the LCD unit 14.

A flash memory 33 and a main memory 34, which is formed from a RAM (Random Access Memory), are connected to the main CPU 31.

Various necessary programs and data such as still image data and music data are written in advance in the flash memory 33.

Meanwhile, data such as still image data or music data acquired from a server when the image display apparatus 10 is connected to the server as hereinafter described or acquired from the memory 37, 38 or 39 are developed and temporarily stored into the main memory 34 so as to be used for reproduction display of a still image or reproduction outputting of music.

Further, an LCD control circuit 44, a backlight control circuit 45 and a sound processing section 46 are connected to the main CPU 31, and speakers 47L and 47R are connected to the output side of the sound processing section 46. The sound processing section 46 includes a D/A converter for converting digital sound data such as music data into an analog sound signal, and a sound amplification circuit.

A radio LAN module 48 is connected to the main CPU 31, and a built-in antenna 49 is connected to the radio LAN module 48.

Further, the USB terminal 24 and a memory control circuit 36 are connected to the main CPU 31 through a USB interface 35, and the memories 37, 38 and 39 described above and inserted in the slots 27, 28 and 29 are connected to the memory control circuit 36.

<Function>

In the image display apparatus 10 having the configuration described above, the radio LAN switch 25 can be slidably moved rightwardly as viewed from the back face side of the apparatus as seen in FIGS. 1D and 5 and switched on and off to connect the image display apparatus 10 to a main server such as a PC (Personal Computer) which includes a hard disk storage apparatus of a large capacity or a hard disk recorder or a sub server such as a notebook PC. Thus, the image display apparatus 10 can acquire still image data or music data recorded in the main server or sub server connected thereto and reproduce and display a still image or reproduce and output music.

In this instance, such a connection destination selection screen image 16 as seen in FIG. 7 is displayed on the LCD unit 14 in response to operation of the remote controller 60.

If the user selects a server of a connection destination, then the main CPU 31 establishes connection to the server through the radio LAN module 48.

Then, for example, folders recorded in the server selected by the user are first displayed as a folder selection screen image on the LCD unit 14. Then, if the user selects a folder from among the displayed folders, then files in the selected folder are displayed on the file selection screen image.

FIG. 8 shows a file selection screen image 17 on which, when a folder of photograph images is selected, information of a thumbnail image and an image pickup date of the files in the folder is displayed.

If the user selects a file in this state, then the photograph images of the selected file are displayed on the LCD unit 14. Then, if the user designates slideshow display, then the photograph images of the file in the folder are successively displayed in an enlarged scale.

A still image or music can be reproduced similarly also by connecting the image display apparatus 10 and a server to each other by a USB cable.

Further, also by inserting the memory 37, 38 or 39 into the slot 27, 28 or 29 or also by connecting a memory with a USB terminal to the USB terminal 24, a still image or music can be reproduced similarly.

2. Light Receiving Apparatus

FIGS. 9A to 13

Details of the light receiving section 50 in the image display apparatus 10 described above are shown in FIGS. 9A to 13.

Figure 10:
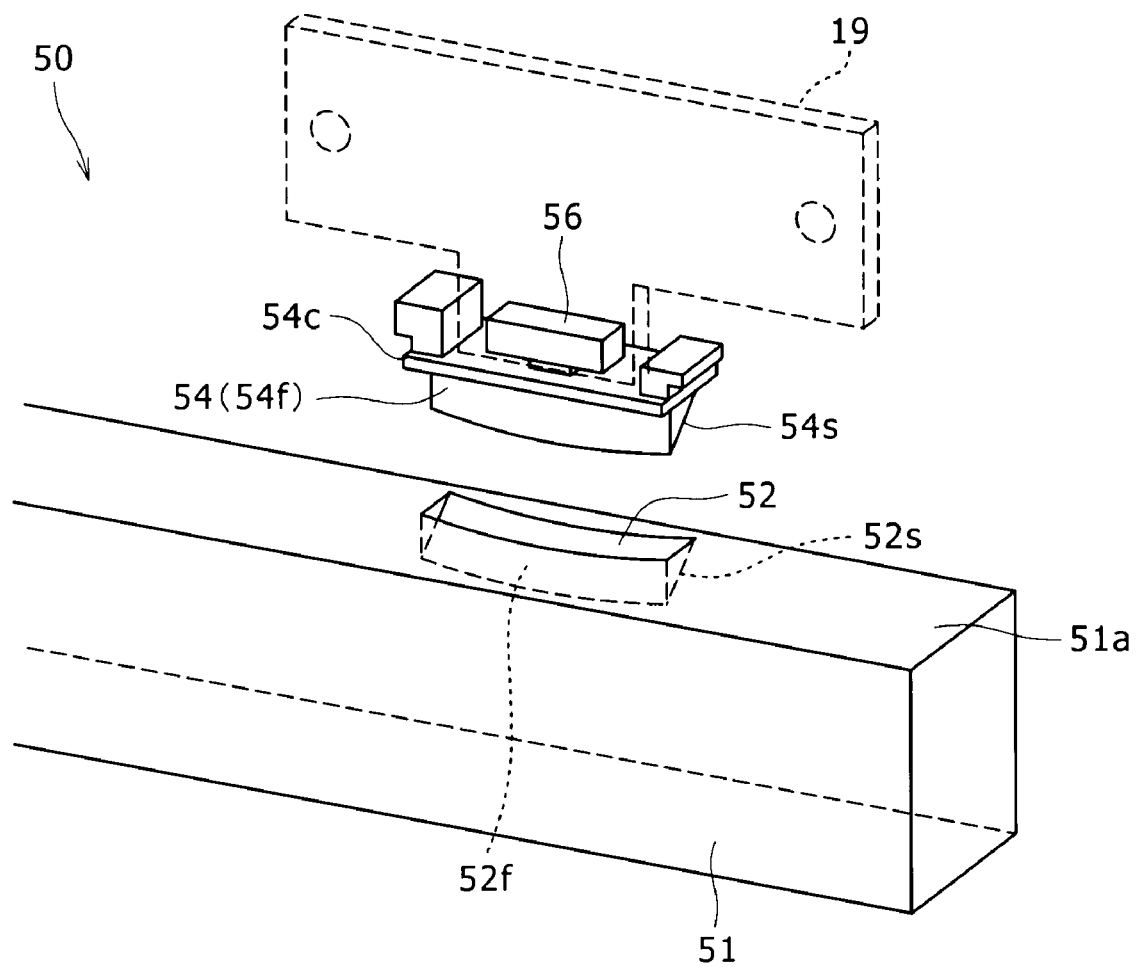
FIGS. 10 and 11 are schematic views of the light receiving apparatus before and after completion of assembly, respectively.
Figure 11:
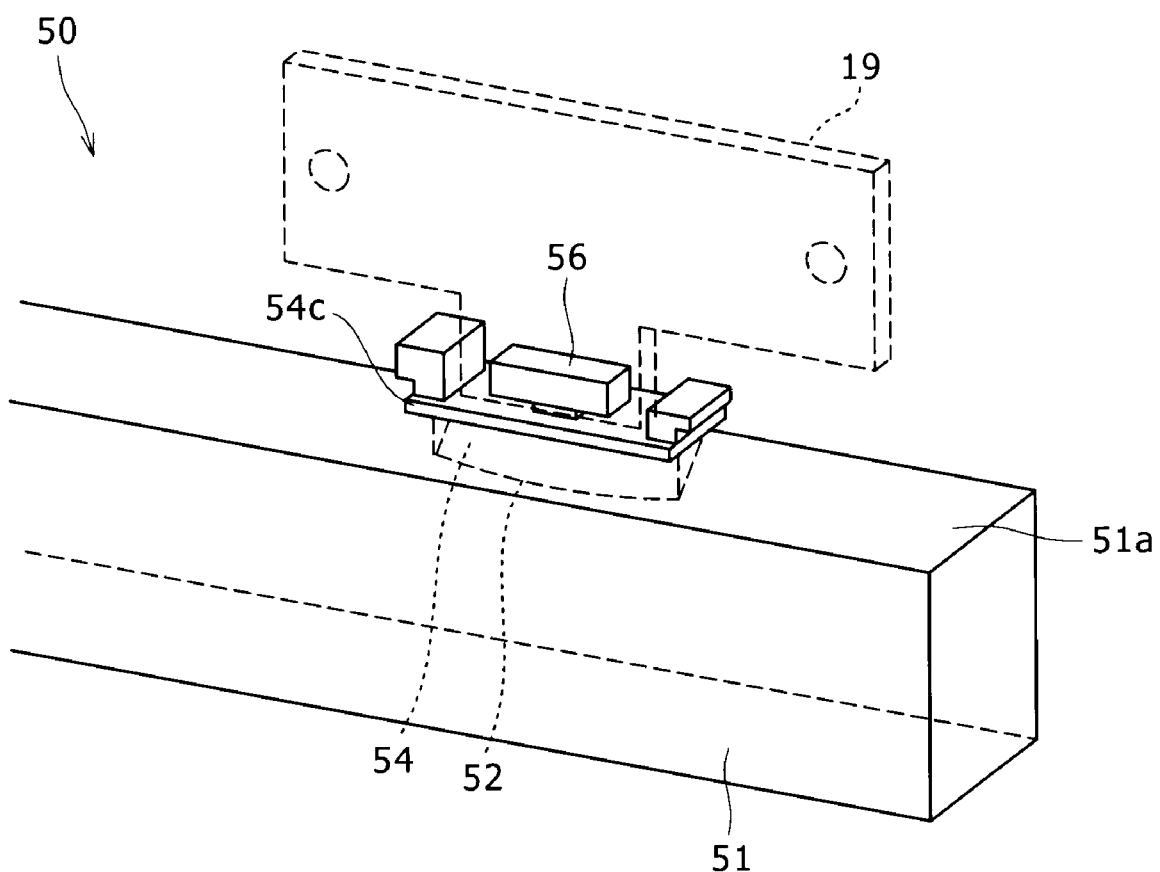
Figure 12:
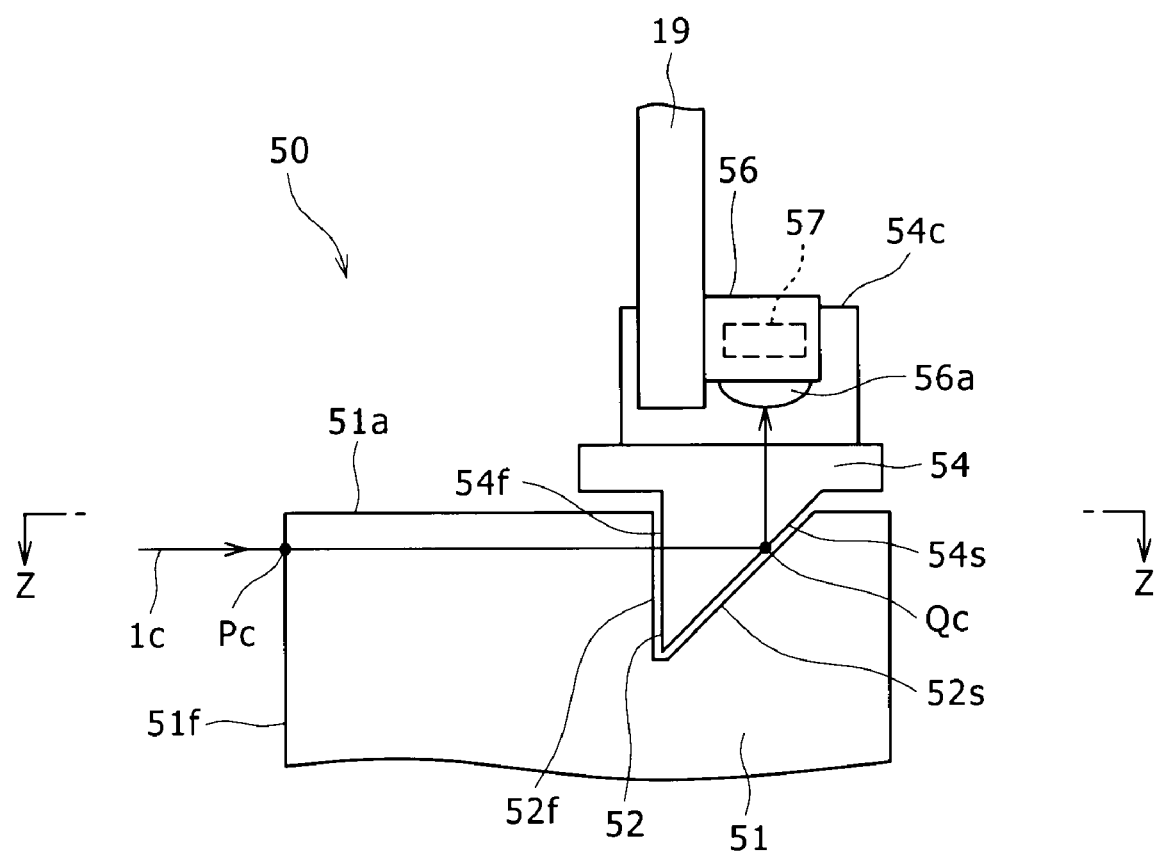
FIG. 12 is a schematic sectional view of the light receiving apparatus.
Figure 13:
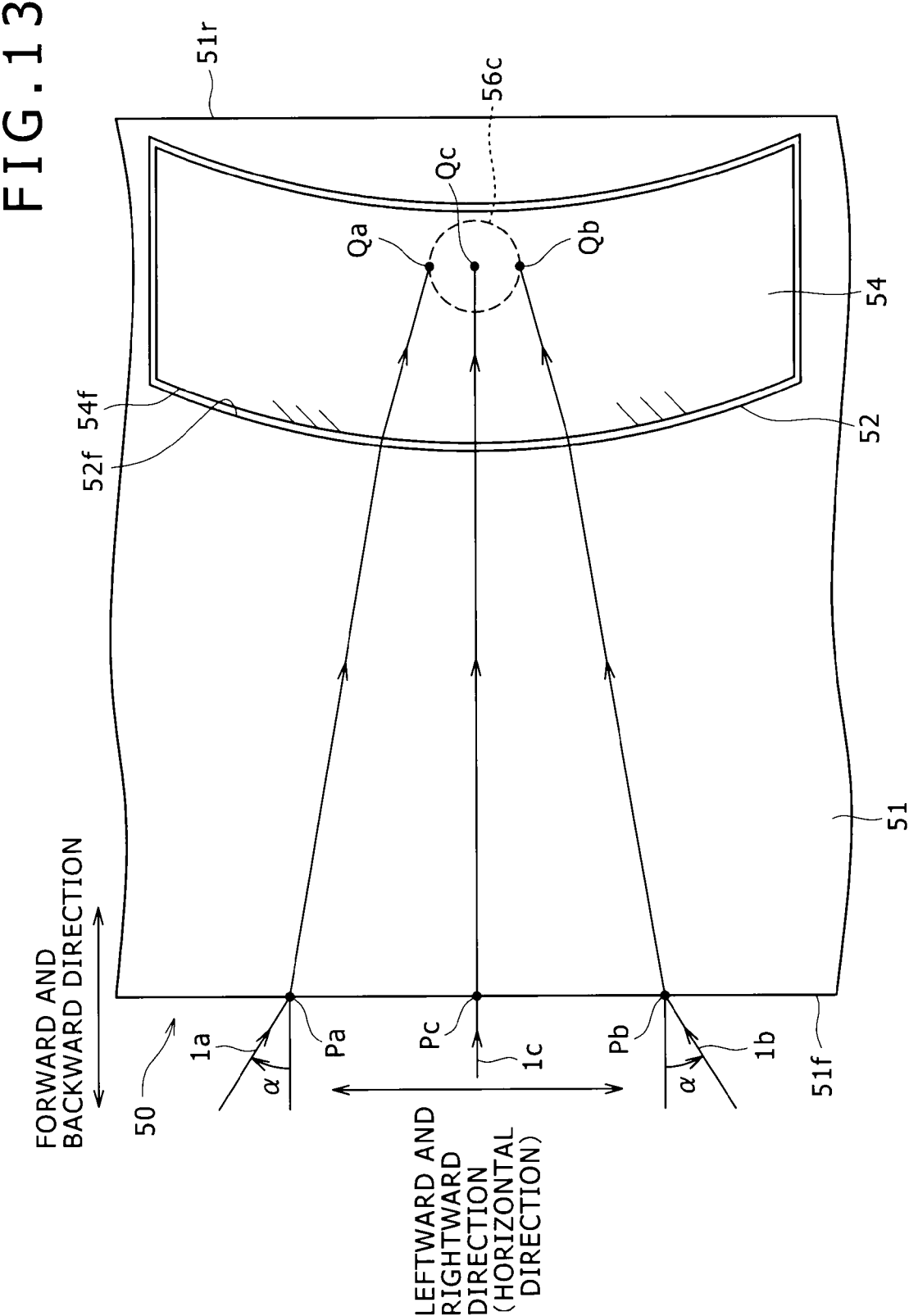
FIG. 13 is a sectional view taken along line Z-Z of FIG. 12.

FIGS. 9A and 9B show the transparent part or stand 51, and FIG. 10 shows the light guiding part 54 before the light guiding part 54 is inserted into the groove 52 of the transparent part 51 before completion of assembly of the apparatus while FIG. 11 shows the light guiding part 54 after the light guiding part 54 is inserted into the groove 52 of the transparent part 51. Further, FIG. 12 shows a cross section taken along line X-X of FIGS. 9A and 9B in the state wherein the light guiding part 54 is inserted in the groove 52 of the transparent part 51. Meanwhile, FIG. 13 shows a cross section taken along line Z-Z of FIG. 12 in the state wherein the light guiding part 54 is inserted in the groove 52 of the transparent part 51.

In the following description, several directions defined as given below are used.

(a) Leftward and rightward direction (horizontal direction): horizontal direction (leftward and rightward direction) of the screen of the LCD 14

(b) Upward and downward direction (vertical direction): vertical direction (upward and downward direction) or the screen of the LCD 14

(c) Forward and backward direction: direction perpendicular to the screen of the LCD 14

2-1. Configuration

The transparent part 51 is formed from a light-transmitting material such as PMMA as described hereinabove and has a shape of a prism elongated in the leftward and rightward direction as seen in FIGS. 9A and 9B. The groove 52 is formed at a position of an upper face 51a of the transparent part 51 which is near to the right end and besides is near to the back face 51r, and mounting plate portions 53a and 53b are formed at positions at left and right end portions on the upper face 51a near to the back face 51r.

The groove 52 has a bottom face 52s formed as an inclined face such that it has, in the forward and backward direction, a deep triangular shape which extends perpendicularly to a front face 51f and has a depth which increases toward the front side as viewed in a cross section parallel to the depthwise direction of the groove 52 as seen in FIGS. 10, 11 and 12. The groove 52 further has a side face 52f on the front side thereof which is formed not as a flat face parallel to the front face 51f of the stand 51 but as an arcuately curved face which is convex toward the front side. Further, the side face 52f is formed such that it has the same shape with regard to any cross section perpendicular to the front face 51f and also to the depthwise direction of the groove 52.

Referring to FIG. 9A, a rear side end edge 52r of the groove 52 has, for example, an arcuate shape or curved shape of a curvature or a radius of curvature same as that of the side face 52f on the front side in the leftward and rightward direction.

The inclination angle of the bottom face 52s is 45 degrees. Further, as an example, the length or width of the groove 52 in the leftward and rightward direction is approximately 15 mm, and the width or depth of the groove 52 in the forward and backward direction and the maximum depth, that is, the height of the side face 52f, is approximately several mm.

The light guiding part 54 is formed from a light-transmitting material such as PMMA similarly to the transparent part 51, and a lower portion of a base portion 54c of the light guiding part 54 is shaped so as to extend along the groove 52.

A lower face 54s of a lower portion of the light guiding part 54 is shaped such that it has such a triangular shape in the forward and backward direction that it projects downwardly by a greater amount toward the front side as viewed in a section perpendicular to the front face 51f and parallel to the depthwise direction of the groove 52. Further, a side face 54f on the front side of the lower portion of the light guiding part 54 is shaped in the leftward and rightward direction such that it is not a flat face parallel to the front face 51f of the transparent part 51 but an arcuate curved face which is convex to the front side. Furthermore, the side face 54f is formed such that it has the same shape in any cross section perpendicular to the front face 51f and also to the depthwise direction of the groove 52.

Figure 3:
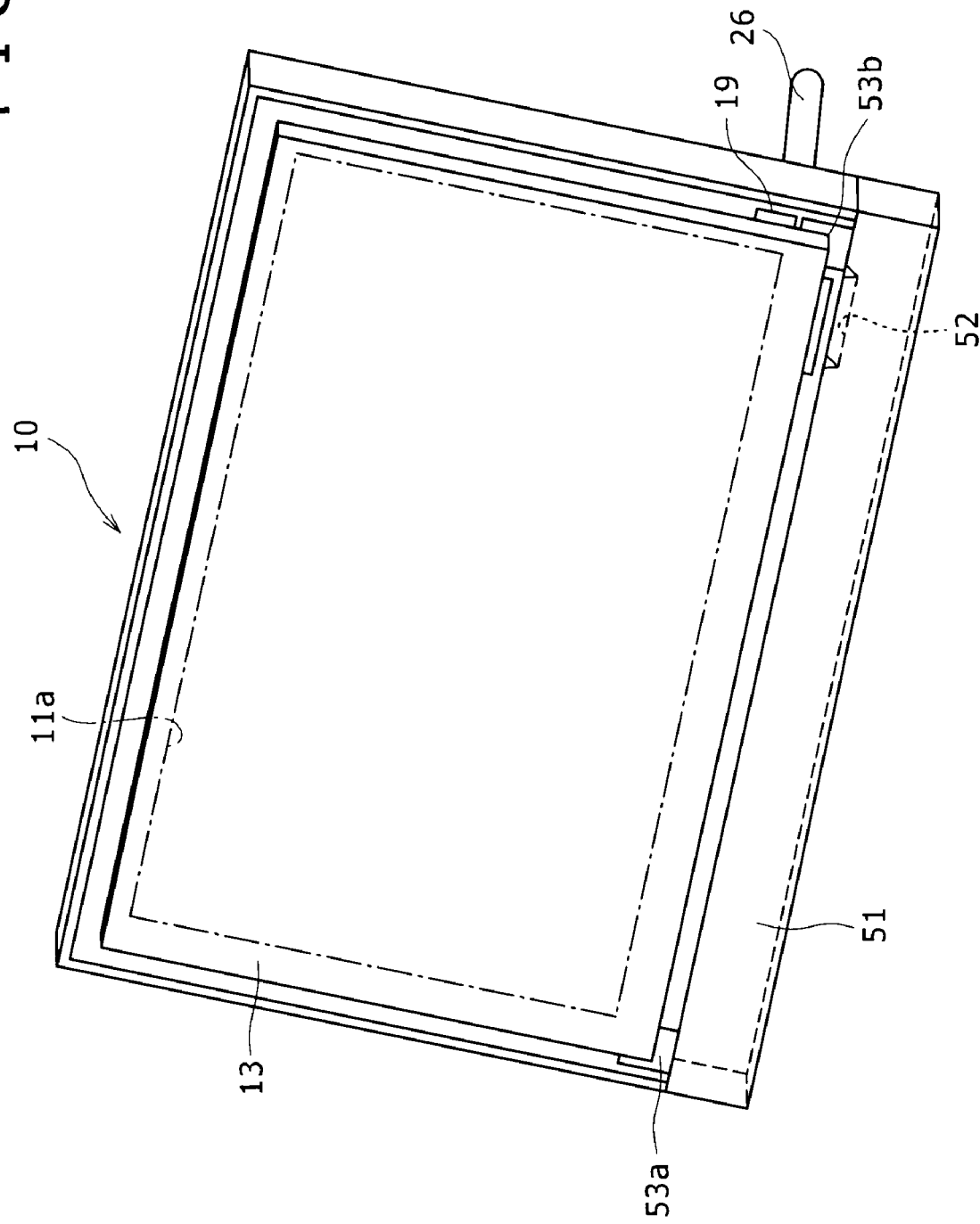
FIGS. 3 and 4 are simplified schematic views showing an internal structure of the image display apparatus of FIGS. 1A to 1F.
Figure 4:
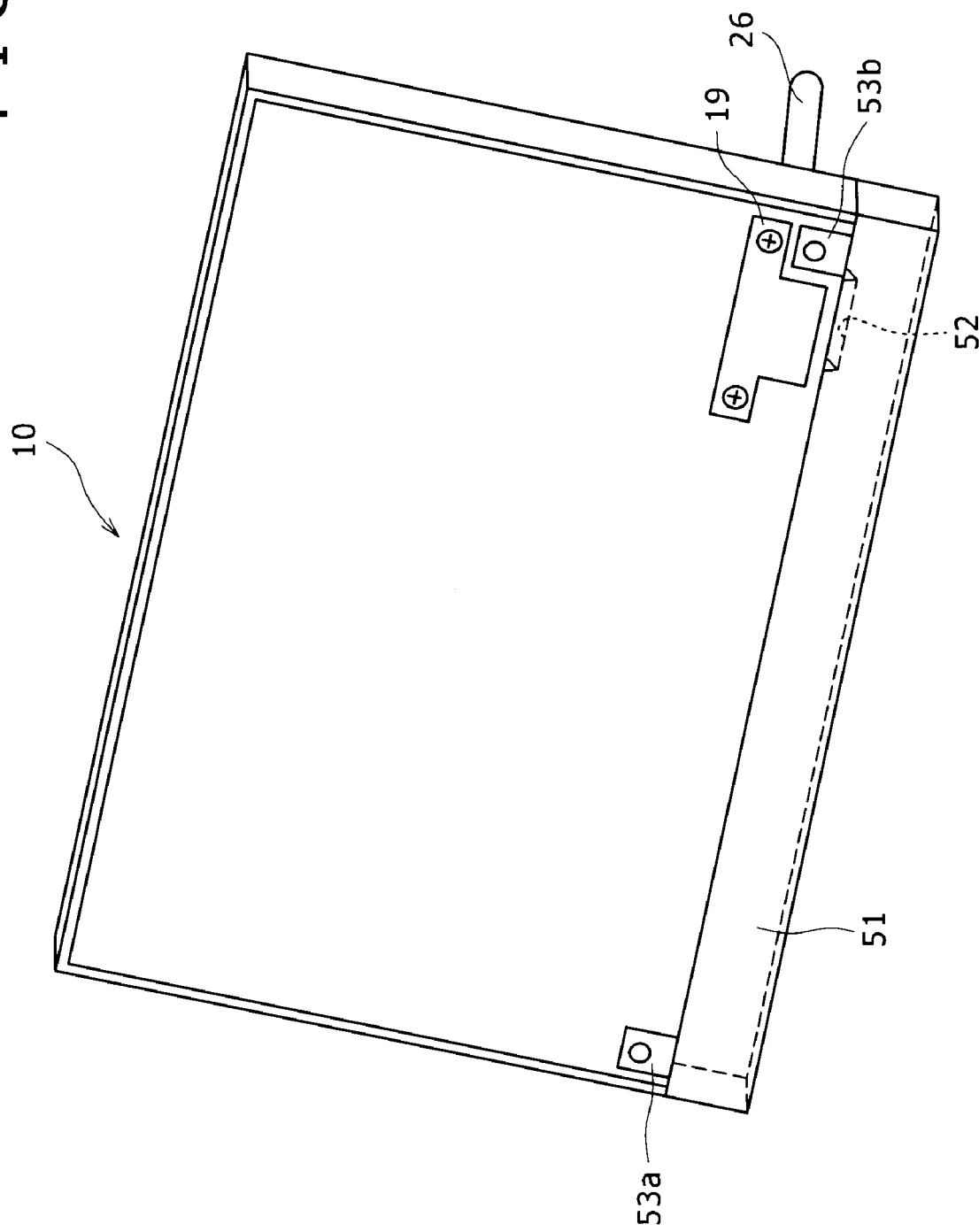

Referring to FIG. 12, the light emitting section 56 including the light receiving element 57 is attached to the back of the light receiving section mounting board 19 shown in FIGS. 3 and 4 such that a projection 56a for condensing incident light is directed downwardly.

Then, in the state wherein the light emitting section 56 is attached to the back of the light receiving section mounting board 19 and the light guiding part 54 is attached to the lower side of the light receiving section mounting board 19 as seen in FIG. 10, the mounting plate portions 53a and 53b of the transparent part 51 are attached to the back of the LCD panel 13 by means of screws as seen in FIG. 3 to insert the lower portion of the light guiding part 54 into the groove 52 of the transparent part 51 so that the lower face 54s of the light guiding part 54 approaches the bottom face 52s of the groove 52 and the side face 54f of the light guiding part 54 approaches the side face 52f of the groove 52 as seen in FIGS. 11 and 12.

2-2. Operation and Effects

In the light receiving section 50 having the configuration described above, when signal light 1 from the remote controller 60 shown in FIG. 6 becomes incident, as indicated as incident light 1c in FIGS. 12 and 13, to the point Pc on the front face 51f of the transparent part 51 perpendicularly to the front face 51f, that is, at an incident angle of 0 degree in both of the leftward and rightward direction and the upward and downward direction, the incident light 1c advances straightforwardly to the point Qc on the lower face 54s of the light guiding part 54 through the transparent part 51 and the light guiding part 54. Then, the incident light 1c is reflected upwardly at the point Qc and is received as light incident to the center of an effective receiving area 56c by the light receiving element 57 of the light emitting section 56.

Though not shown in FIG. 12, for example, also signal light incident to the point Pc at an incident angle of 0 degree in the leftward and rightward direction and at an incident angle within a fixed rage in the upward and downward direction is received by the light emitting section 56 similarly.

Further, with regard to the leftward and rightward direction, as indicated as incident light 1a in FIG. 13, signal light incident at a certain incident angle α in the leftward direction to the point Pa spaced by a certain distance in the leftward direction from the point Pc on the front face 51f of the transparent part 51 is refracted by the front face 51f and enters the transparent part 51. Thereafter, the incident light 1a enters the side face 52f formed as an arcuately curved face convex to the front side of the groove 52 and the side face 54f formed as an arcuately curved face convex to the front side of the light guiding part 54 as incident light having a comparatively small angle or incident angle with respect to the normal directions which are perpendicular to individual tangential directions to the side face 52f and the side face 54f. Accordingly, the incident light 1a comes to the point Qa corresponding to the left end of the effective receiving area 56c on the lower face 54s of the light guiding part 54 and is directed upwardly at the point Qa and received by the light receiving element 57 of the light emitting section 56.

Similarly, as indicated as incident light 1b in FIG. 13, signal light incident at the certain incident angle α to the point Pb spaced by the certain distance in the rightward direction from the point Pc on the front face 51f of the transparent part 51 is refracted by the front face 51f and enters the transparent part 51. Thereafter, the incident light 1b enters the side face 52f formed as an arcuately curved face convex to the front side of the groove 52 and the side face 54f formed as an arcuately curved face convex to the front side of the light guiding part 54 as incident light having comparatively small angles or incident angles to the normal directions which are perpendicular to the tangential directions to the side face 52f and the side face 54f. Accordingly, the incident light 1b comes to a point Qb corresponding to the right end of the effective receiving area 56c on the lower face 54s of the light guiding part 54 and is reflected upwardly at the point Qb and received by the light receiving element 57 of the light emitting section 56.

Figure 14:
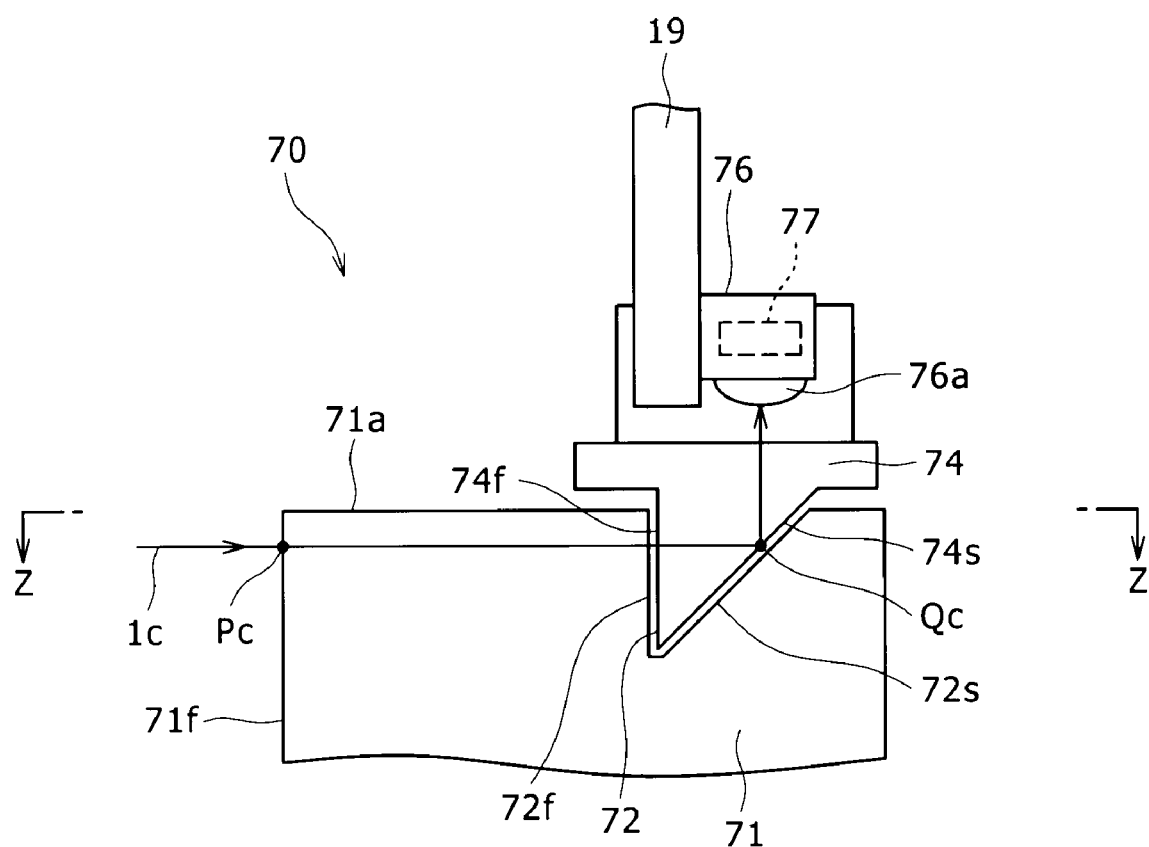
FIG. 14 is a schematic view showing a possible example of a light receiving apparatus.
Figure 16B:
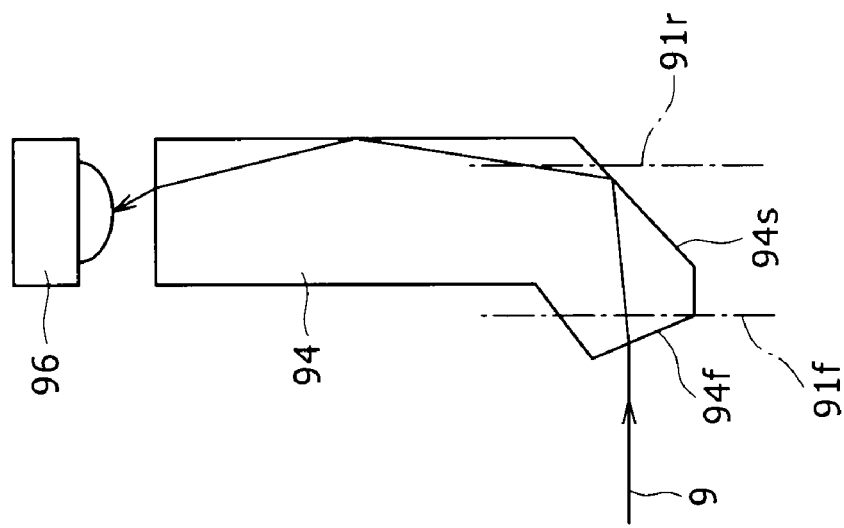
FIGS. 16A and 16B are schematic views showing a known light receiving apparatus.
Figure 16A:
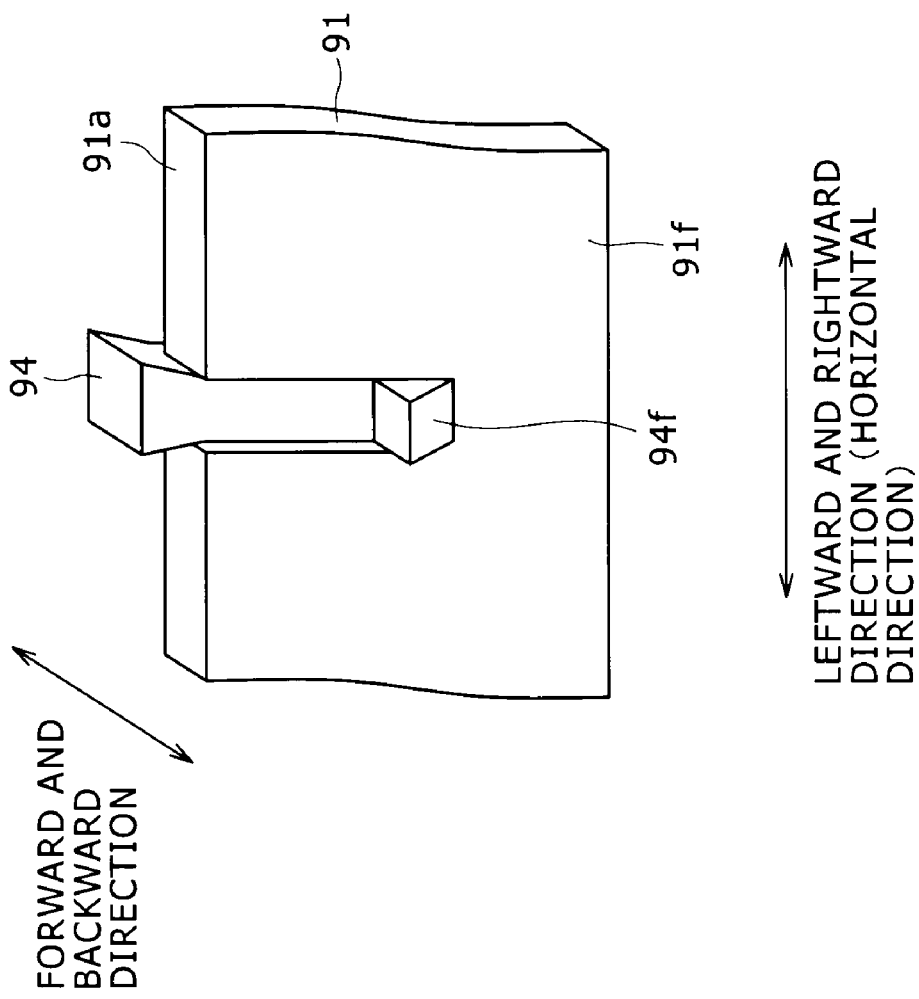

In contrast, in the light receiving apparatus 70 shown in FIGS. 14 and 15, since the side face 72f of the groove 72 of the transparent part 71 and the side face 74f of the light guiding part 74 extend in parallel to the front face 71f of the transparent part 71, as described hereinabove with reference to FIG. 15, signal light incident at the certain incident angle α in the leftward direction or the rightward direction to the point Pa or the point Pb on the front face 71f of the transparent part 71 spaced by the certain distance in the leftward or rightward direction from the point Pc like the incident light 1a or 1b is refracted by the front face 71f and enters the transparent part 71. Thereafter, the signal light is incident at a comparatively large incident angle to the side face 72f of the groove 72 and the side face 74f of the light guiding part 74. Therefore, the signal light is reflected upwardly at a point spaced in the leftward direction from the point Qa on the lower face 74s of the light guiding part 74 corresponding to the left end of the effective receiving area 76c or at another point spaced in the rightward direction from the point Qb corresponding to the right end of the effective receiving area 76c. Therefore, the signal light is not received by the light receiving section 76.

Accordingly, where the horizontal width of the light receiving section, that is, the width in the leftward and rightward direction, is equal, the range of the incident position and the incident angle to the transparent part in the leftward and rightward direction within which light can be received by the light receiving section in the light receiving section 50 described hereinabove with reference to FIGS. 9A to 13 can be made greater than that in the light receiving apparatus 70 described hereinabove with reference to FIGS. 14 and 15.

On the contrary, where the range of the incident position and the incident angle to the transparent part in the leftward and rightward direction is equal, the horizontal width of the light receiving section in the light receiving section 50 described hereinabove with reference to FIGS. 9A to 13 can be made smaller than that in the light receiving apparatus 70 described hereinabove with reference to FIGS. 14 and 15.

3. Other Examples and Embodiments

In the example described above, also the rear end edge 52r of the groove 52 has an arcuate portion or curved portion of a curvature or a radius of curvature equal to that of the side face 52f on the front side. However, the rear end edge 52r of the groove 52 may otherwise be formed, for example, as a straight line.

Further, the end faces of the groove 52 in the leftward and rightward direction and the end faces in the leftward and rightward directions of the portion to be inserted into the groove 52 of the light guiding part 54 may be formed not as faces perpendicular to the leftward and rightward direction but as faces inclined in the leftward and rightward direction.

Further, while the side face 52f of the groove 52 and the side face 54f of the portion of the light guiding part 54 to be inserted into the groove 52 are formed as arcuately curved faces convex to the front side in the leftward and rightward direction, they may otherwise be formed as faces inclined a little to the front side or the back side in the forward direction relative to the front face 51f. Also in this instance, as described hereinabove in connection with the example described above, the side face 52f is formed so as to have the same shape in any cross section perpendicular to the front face 51f and also to the depthwise direction of the groove 52, and the side face 54f is formed so as to have the same shape in any cross section perpendicular to the front face 51f and also to the depthwise direction of the groove 52.

Further, the light receiving apparatus and the electronic apparatus which includes the light receiving apparatus are not limited to those which receive signal light of infrared rays from a remote controller but may be those which receive information such as data transmitted by optical communication. Further, the electronic apparatus which includes the light receiving apparatus may be such an apparatus as an air conditioning apparatus which does not include a display panel such as an LCD panel.

While, in the example described above, the display section is the LCD panel 13, a display apparatus of any other type such as an organic EL (electroluminescence) panel may be used only if it can display an image.

The transparent part 51 is not formed as a part for use as a stand for supporting the apparatus uprightly. Further, the groove 52 may be formed in a transparent part provided around a display apparatus housing. Furthermore, the transparent sheathing member may be attached with part thereof accommodated in the inside of the display apparatus housing.

Further, only if the side face 52f and the bottom face 52s having the shapes described above are formed on the groove 52, the other faces of the groove 52 may have any shape.

Furthermore, only if the side face 54f and the lower face 54s of the shapes described above are formed on the light guiding part 54, the other faces of the light guiding part 54 may have any shape.

The light guiding part 54 and the light receiving section 56 may be disposed in the inside of a transparent part in such a manner that they do not project from the upper face 51a. In this instance, preferably the transparent sheathing member is attached so as to be accommodated in the inside or rearwardly of the display apparatus housing such that the light emitting section 56 is not exposed from the display apparatus housing as viewed from the front of the apparatus.

It should be understood by those skilled in the art that various modifications, combinations, sub-combinations and alterations may occur depending on design requirements and other factor in so far as they are within the scope of the appended claims or the equivalents thereof.

What is claimed is:

1. A light receiving apparatus, comprising:
a light receiving section including a light receiving element;
a transparent part having a front face which is a first face to which signal light is incident and a second face extending perpendicularly to said first face and having a groove formed thereon; and
a light guiding part inserted in said groove;
said groove having a bottom face formed as an inclined face having a depth which increases toward the front face side;
said groove further having, on the front face side, a side face formed as an arcuately curved face convex toward the front face side and having the same shape in any cross section perpendicular to the front face and also to the depthwise direction of said groove;
said light guiding part having a face opposing to the bottom face of said groove, formed as an inclined face having a depth which increases toward the front side face in a state in which said light guiding part is inserted in said groove;
said light guiding part further having a side face opposing to the side face of said groove on the front face side and formed as an arcuately curved face which is convex toward the front face side in a state wherein said light guiding part is inserted in said groove and which has the same shape in any cross section perpendicular to the front face and also to the depthwise direction of said groove.

2. An electronic apparatus, comprising:
a light receiving section including a light receiving element;
a transparent part having a front face which is a first face to which signal light is incident and a second face extending perpendicularly to said first face and having a groove formed thereon; and
a light guiding part inserted in said groove;
said groove having a bottom face formed as an inclined face having a depth which increases toward the front face side;
said groove further having, on the front face side, a side face formed as an arcuately curved face convex toward the front face side and having the same shape in any cross section perpendicular to the front face and also to the depthwise direction of said groove;
said light guiding part having a face opposing to the bottom face of said groove, formed as an inclined face having a depth which increases toward the front side face in a state in which said light guiding part is inserted in said groove;
said light guiding part further having a side face opposing to the side face of said groove on the front face side and formed as an arcuately curved face which is convex toward the front face side in a state wherein said light guiding part is inserted in said groove and which has the same shape in any cross section perpendicular to the front face and also to the depthwise direction of said groove.

3. The electronic apparatus according to claim 2, wherein the signal light is infrared rays from a remote controller.

4. An image display apparatus, comprising:
a display apparatus housing;
a display section mounted in the inside of said display apparatus housing;
a light receiving section including a light receiving element;
a transparent part having a front face which is a first face to which signal light is incident and a second face extending perpendicularly to said first face and having a groove formed thereon; and
a light guiding part inserted in said groove;
said groove having a bottom face formed as an inclined face having a depth which increases toward the front face side;
said groove further having, on the front face side, a side face formed as an arcuately curved face convex toward the front face side and having the same shape in any cross section perpendicular to the front face and also to the depthwise direction of said groove;
said light guiding part having a face opposing to the bottom face of said groove, formed as an inclined face having a depth which increases toward the front side face in a state in which said light guiding part is inserted in said groove;
said light guiding part further having a side face opposing to the side face of said groove on the front face side and formed as an arcuately curved face which is convex toward the front face side in a state wherein said light guiding part is inserted in said groove and which has the same shape in any cross section perpendicular to the front face and also to the depthwise direction of said groove;
said transparent part being attached to a side edge of said display apparatus housing in such a manner as to be exposed partly or entirely.

5. The image display apparatus according to claim 4, wherein the signal light is infrared rays from a remote controller.

* * * * *